(No Model.)

A. CALDWELL.
SOCKET TIP FOR FLEXIBLE TUBING.

No. 450,139. Patented Apr. 14, 1891.

Witnesses
Chas. F. Schmelz.
James W. Beuman

Inventor
Alfred Caldwell
By his Attorney
S. Scholfield

UNITED STATES PATENT OFFICE.

ALFRED CALDWELL, OF PROVIDENCE, RHODE ISLAND.

SOCKET-TIP FOR FLEXIBLE TUBING.

SPECIFICATION forming part of Letters Patent No. 450,139, dated April 14, 1891.

Application filed December 9, 1889. Serial No. 333,107. (No model.)

*To all whom it may concern:*

Be it known that I, ALFRED CALDWELL, residing at Providence, in the State of Rhode Island, have invented a new and useful Improvement in Socket-Tips for Flexible Tubing, of which the following is a specification.

My invention relates to socket-tips for connecting two tubes or pipes or a flexible tube to a gas pipe or burner, as will be hereinafter more particularly pointed out.

In my former patent, No. 425,367, I made the socket entirely out of rubber, vulcanizing a portion of it; but in such construction the smaller portion, to which the flexible tube is to be secured, must be made so thin that in screwing it into the end of a tube it is liable to break, and especially as its exterior must be provided with screw-threads to cause it to enter the end of the tube. Although it is primarily intended to be used with a tube having a spiral-wire foundation, which forms a screw-thread into which the screw-threads of the socket could enter, it frequently happens that it is desirable to fasten the socket to a flexible tube that is not provided with any interior screw-thread, and the screw-thread of the socket must form its own threads. In such cases it requires considerable force to make the small portion of the socket enter the tube, and as a consequence the thin vulcanized shell is very apt to crack or break. To obviate this defect I find it necessary to provide the socket with a more substantial portion than a vulcanized rubber shell in which to cut the screw-threads, and for this purpose I make use of a short metallic attaching-piece, which is vulcanized to one end of the rubber socket, while the remaining portion of the socket which is to slip over the pipe or gas-jet is left soft and elastic.

Figure 1:
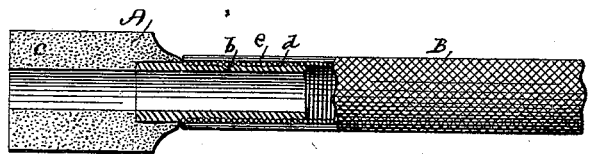
Figure 2:
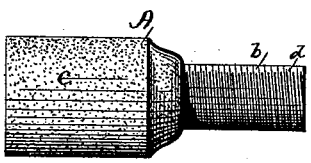
Figure 3:
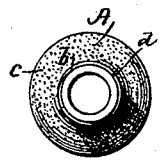

Referring to the accompanying drawings, in which the same reference-letters indicate corresponding parts in each of the views, Figure 1 is a longitudinal sectional view of my socket-tip. Fig. 2 is a side view of the same, and Fig. 3 is an end view.

The tip A is preferably formed of two short tubes $b$ and $c$, the tube $b$ being of metal and provided with exterior screw-threads $d$, and the tube $c$ being of rubber, into one end of which the tube $b$ is secured. After the end of the metallic tube has been forced into the end of the soft-rubber tube as far as desired the two pieces are placed into a suitable mold and the portion of the rubber which surrounds the metallic tube and is in direct contact with it is vulcanized. This vulcanization of the rubber causes it to adhere very firmly to the metallic tube, so that it is impossible to separate them under ordinary circumstances, and yet it leaves the free or outer end of the rubber in its soft and flexible condition, so that it can be placed over the end of another tube or gas jet, even if the tube is of a larger diameter than the interior diameter of the rubber tube. As the vulcanized portion of the rubber is so firmly attached to the metallic tube, there is no danger of cracking or breaking it by stretching the flexible portion over a larger tube, as might be done if there were no rigid metallic portion, as in my former patent; and with a metallic tube having screw-threads $d$ upon its exterior the socket can be secured to a flexible tube of substantially the same or less diameter, even though it has to make its own threads as it goes, although I prefer using it with a tube B, having a spiral wire $e$ for its foundation, the coils of which form threads which take into the threads of the tube $b$ and hold the two securely together. With a metallic screw-threaded tube there is no danger of breaking the socket in forcing it into the end of a small tube, as there would be if the whole socket were made out of rubber, with one end of it reduced to a mere shell and that portion then vulcanized, and at the same time the flexibility of the unvulcanized portion of the rubber permits of sufficient elasticity to permit of all the motion or bending necessary in securing the tube to the end of a pipe—as, for instance, a gas-jet.

Having thus described my invention, I claim—

A flexible socket-tip consisting of a short metallic tube and a rubber tube secured to one end thereof, the portion of the rubber tube surrounding the end of the metallic tube and in contact therewith being vulcanized, while the projecting portion of the rubber is elastic or unvulcanized, substantially as described.

ALFRED CALDWELL.

Witnesses:
SOCRATES SCHOLFIELD,
H. S. BABCOCK.